Aug. 18, 1964  S. HENIG  3,144,948
COLLOCATING MACHINE USING A TIME-POSITION CODE
Filed Jan. 23, 1962  5 Sheets-Sheet 1

INVENTOR
Seymour Henig
BY
David Robbins
ATTORNEY

Aug. 18, 1964 S. HENIG 3,144,948
COLLOCATING MACHINE USING A TIME-POSITION CODE
Filed Jan. 23, 1962 5 Sheets-Sheet 2
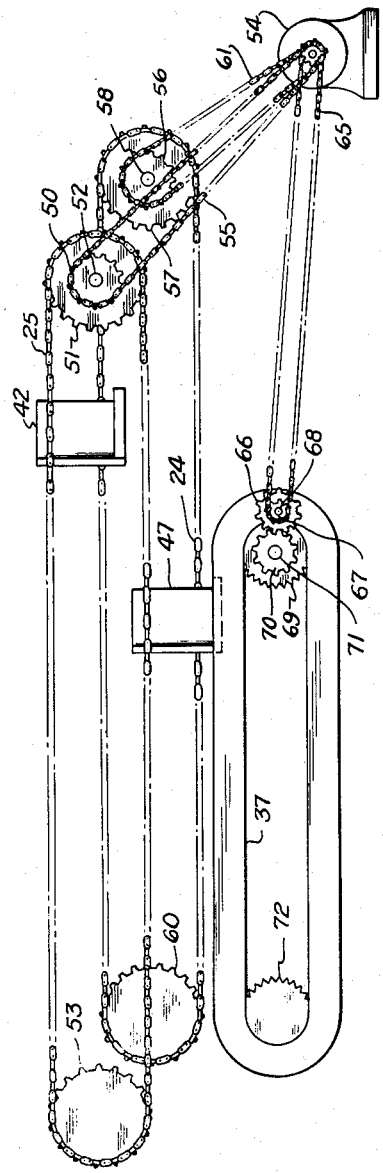
Fig. 6
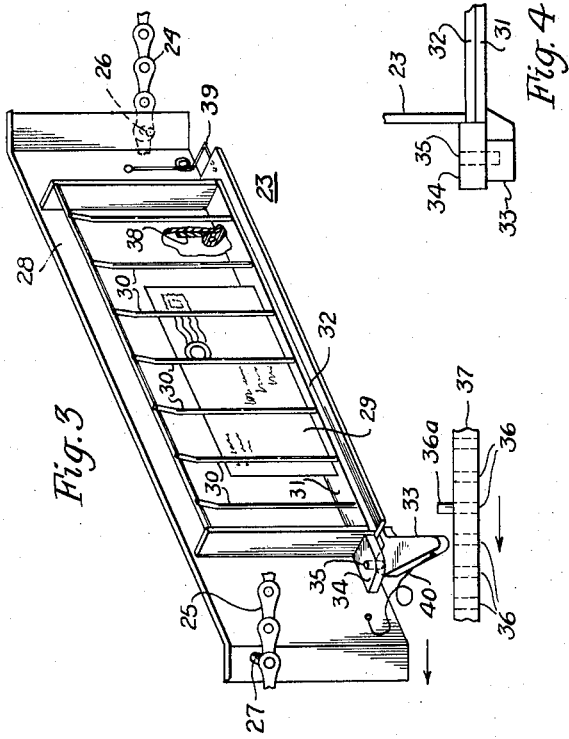
Fig. 5
Fig. 4
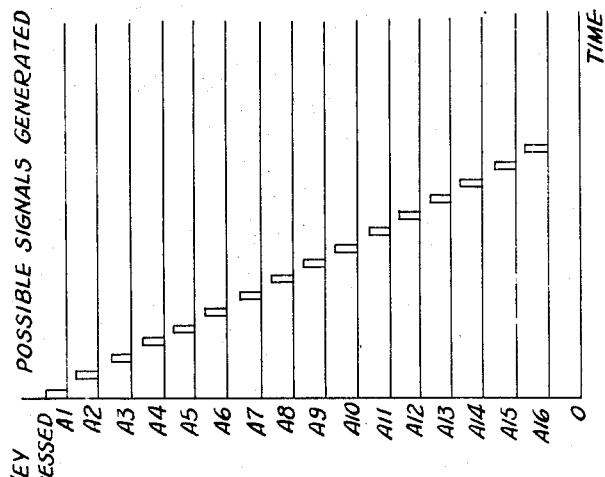
Fig. 10
INVENTOR
Seymour Henig
BY
ATTORNEY Aug. 18, 1964 S. HENIG 3,144,948
COLLOCATING MACHINE USING A TIME-POSITION CODE
Filed Jan. 23, 1962 5 Sheets-Sheet 3

INVENTOR
Seymour Henig
BY
David Robbins
ATTORNEY

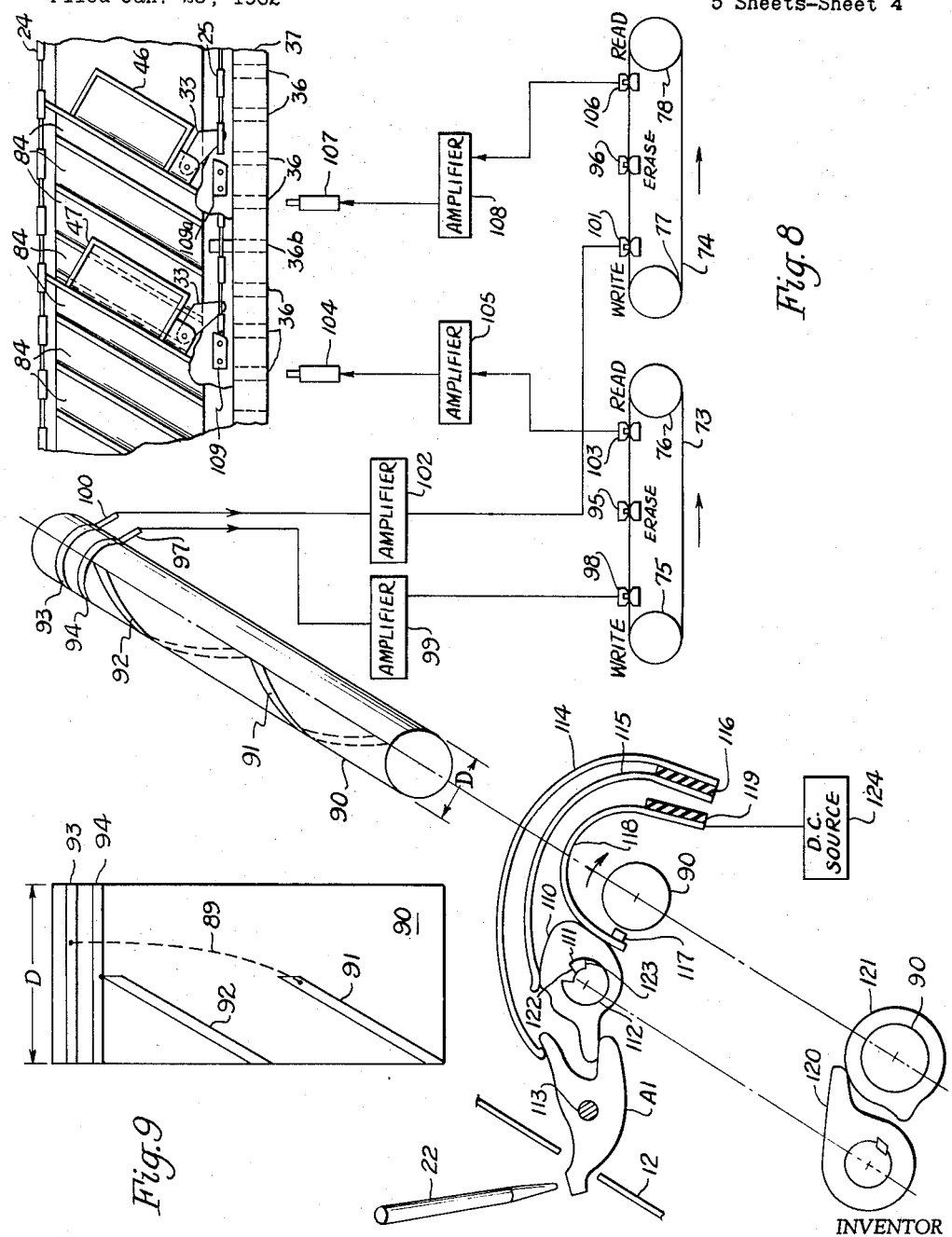

United States Patent Office 3,144,948
Patented Aug. 18, 1964

3,144,948
COLLOCATING MACHINE USING A TIME-POSITION CODE
Seymour Henig, Kensington, Md., assignor to the United States of America as represented by the Secretary of Commerce
Filed Jan. 23, 1962, Ser. No. 168,871
11 Claims. (Cl. 214—11)

This invention relates to a machine employing a time-position code in organizing articles in a selected sequence.

In one sorting machine known in the prior art, each article is encoded in a multielement code. As the article passes the various discharge points, the code is sensed and when it agrees with the code for a point, the article is discharged. In another machine, a multielement code group, used to encode an article, is translated to a single element. The element, recorded on a track of moving tape, is sensed at a certain destination to generate a signal that is employed to discharge the article. These machines have the disadvantage that they require complicated encoding and decoding devices and in addition require the operator to memorize a code group for each destination.

At present, sorting machines are used for simple collocating, but where the task is complex and the articles are not machine readable the task is performed manually. An example is the operation performed by a mail carrier in changing the random order of his letters to the logical arrangement of the order of their delivery. The task is complex because the letter's street and number address is only partly logical with respect to order of delivery and greatly redundant with respect to information pertinent to that order.

Accordingly, an object of the present invention is to provide a collocating machine, using a time-position code, which requires a comparatively simple encoding and decoding device.

Another object is to provide a collocating machine with a substantially larger number of discharge points than control actuators, so as to conserve cost.

Another object of this invention is to provide a machine which reduces an operator's effort in collocating articles without changing his mental task or memory requirement.

Another object is to provide a mail collocator utilizing a keyboard in which the keys are designated by an overlay in the same order as the addresses in the carrier's route, so that the carrier or operator need not memorize a code group for each address.

These and other objects are accomplished by generating a time-position code and assigning each pulse in the code to a particular destination. Each pulse has the same numerical designation in the series of pulses in the code as the associated destination has in its series. Thus, if an article in a container of a distributor is to be routed to the sixth discharge point, the sixth pulse in a time-position code is generated and then employed to control the container, discharging the article at the desired point.

More specifically, in a mail collocator constructed in accordance with the present invention, an overlay on a keyboard designates the keys in the same order as the addresses in the carrier's route. After reading an address on a letter in a container passing before him, the carrier, knowing the location of the address on the route, can locate the associated key without memorizing a code group for each address. When he strikes the key, a pulse in the time-position code is generated and then used to set one of a plurality of pins. The container and the pins are driven at relative speeds selected so that the set pin will engage a latch on the container, discharging the letter in its proper position with relation to other letters to be delivered on the route.

Referring to the drawings wherein like numerals designate like parts throughout the figures and wherein:

FIG. 3 is a pictorial of a container used in the distributor in FIG. 1;

FIG. 4 is a detail of the container shown in FIG. 3;

FIG. 6 is a partial side view of the embodiment in FIG. 1;

FIG. 8 is schematic of the electro-mechanical circuits used in FIG. 1;

FIG. 9 is a development of shaft 90 in FIG. 8;

FIG. 10 represents the time-position code generated in the embodiment in FIG. 1.

Figure 1:
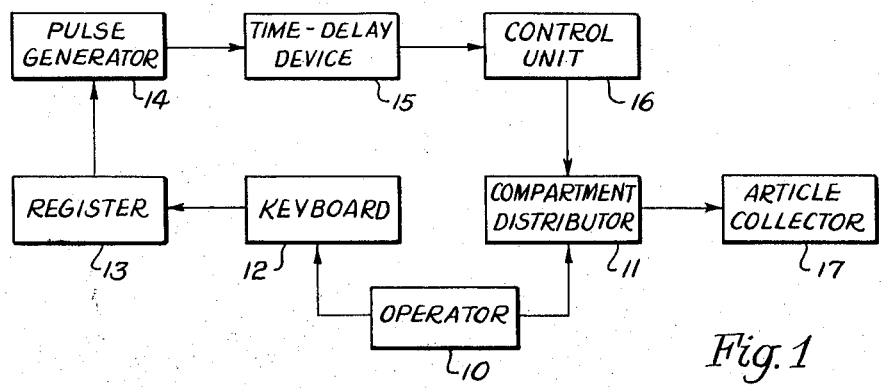
FIG. 1 is a block diagram of an embodiment of the present invention.

Referring to FIG. 1, operator 10, after reading the address of an article in a container in distributor 11 as it passes before him, depresses a key, in keyboard 12, that corresponds to the address. The key operates elements in register 13 which control pulse generator 14 to develop a pulse in a time-position code that is applied to time-delay device 15. After a predetermined delay, the pulse is read out of device 15 and operates control unit 16 to discharge the contents of the container into one of the compartments of article collector 17.

Figure 2:
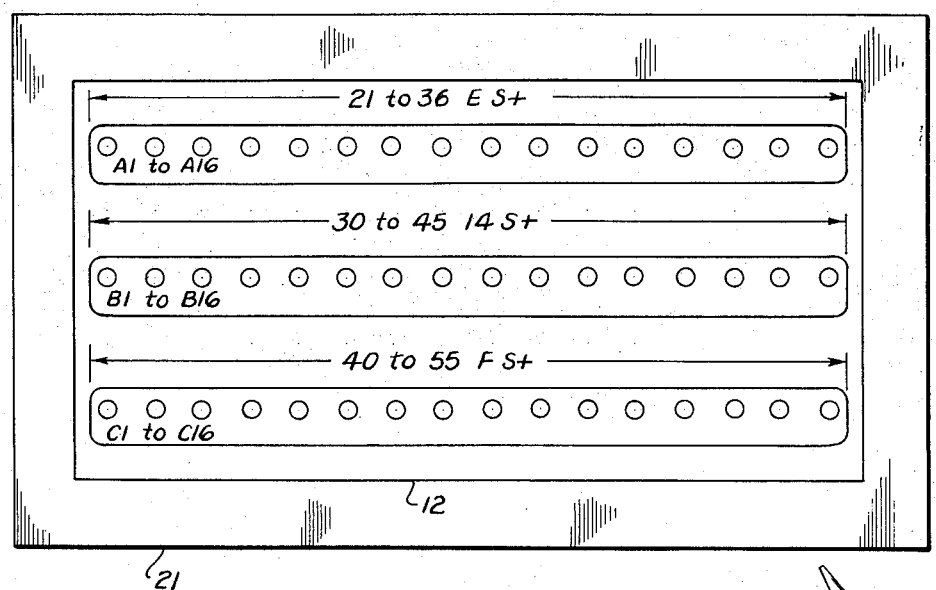
FIG. 2 represents a keyboard and overlay for the keyboard used in FIG. 1.

Referring to FIG. 2, keyboard 12, used in collocating mail, includes three rows of keys A1 to A16, B1 to B16, and C1 to C16. An overlay 21 is positioned over the keys and on the keyboard in such a manner as not to interfere with the operation of the keys. Between the vertical lines on the overlay are printed the numbers and streets associated with the keys, positioned between the lines, so that each key is associated with an address and the keys are arranged in the same sequence on the keyboard as the addresses in the carrier's route. Obviously, as many overlays for as many routes as desired may be used with keyboard 12.

Since the face of each key on the keyboard is comparatively small, and since many more keys than shown in the figure may in practice be placed on the keyboard, stylus 22 is used to depress a selected key.

Referring to FIGS. 3 and 4, container 23 is pivotally mounted on lower and upper drive chains 24, 25 by pins 26, 27, respectively. The container has an open top 28 through which letter 29 may be deposited. The address of the lettter may be viewed through bars 30, which are attached to lower bar 32 of the container. Latch-lever 33 is rotatably mounted on bracket 34 by means of pin 35. The bracket is attached to container 23 by suitable means, not shown.

Pins 36 are shown in control belt 37 in their reset position. When one of the pins, for example 36a is moved to its set position, as illustrated in FIG. 3, and the belt is driven, as described below, the pin will engage and rotate latch-lever 33 clockwise. The bottom gate 31 of container 23 is rotated clockwise on hinge 38 to an open position where it is maintained by spring 39. Letter 29 then drops out of the container. When pin 36a no longer engages lever 33, the latter is rotated counterclockwise under control of spring 40. As container 23 is driven by chains 24, 25 in FIG. 5, the bottom gate 31 engages cam 41a and is rotated to and latched in its closed position.

Figure 5:
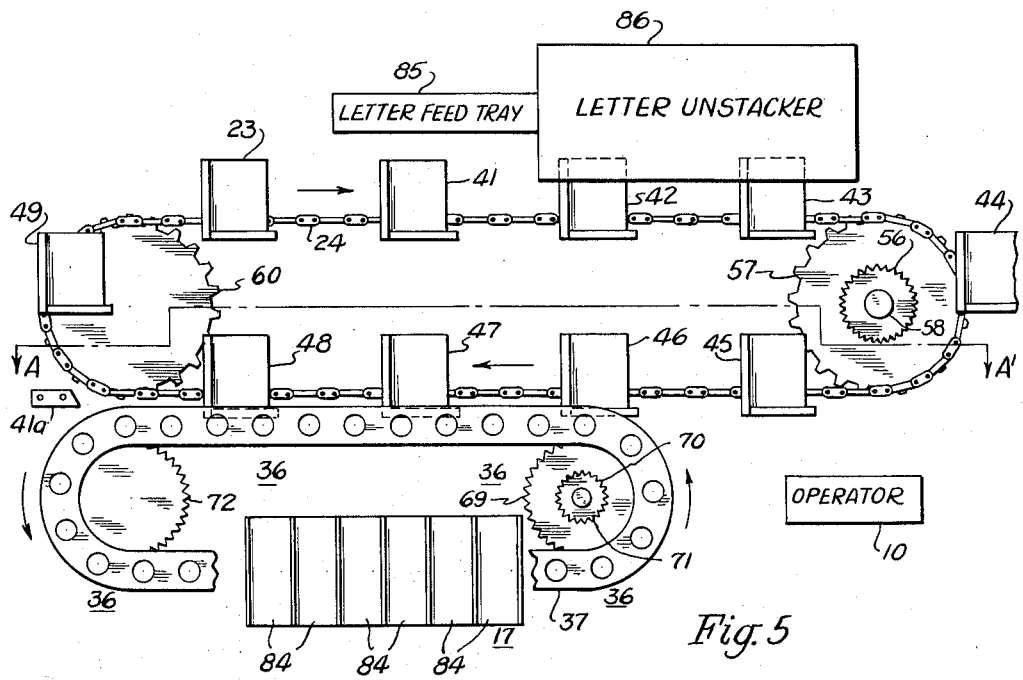
FIG. 5 is a partial side view of the embodiment in FIG. 1 taken along arrow B in FIG. 7, which is a top view of the structure in FIG. 5 taken along line A—A′.

Each container 41 to 49 in FIG. 5 is essentially identical to container 23 and is pivotally mounted on chains 24 and 25 in such a manner that when driven by the chains the letter in each container may be viewed by the operator.

Referring to FIG. 6, for convenience of illustration, containers 42 and 47 are not shown in their proper perspective and pins 36 in control belt 37 are omitted. Sprockets 50, 51 are mounted on shaft 52 and upper drive chain 25, located on sprockets 51 and 53, is driven by motor 54 through chain 55 and sprocket 50. Likewise, sprockets 56 and 57 are mounted on shaft 58 and lower drive chain 24, positioned on sprockets 57 and 60, is driven by the motor through chain 61 and sprocket 56. In a similar manner, gear 66 and sprocket 67 are mounted on shaft 68; sprocket 69 and gear 70 are mounted on shaft 71; control belt 37, which is a cog belt, is positioned on sprockets 69 and 72; and the control belt is driven by the motor through chain 65 and sprocket 67. It is understood that sprockets 53, 60 and 72 are rotatably mounted by conventional means, not shown.

Referring to FIG. 8, magnetic tapes 73, 74 are driven through shafts 75, 76 and 77, 78, respectively, by suitable means known in the art but not illustrated in the figure.

Figure 11:
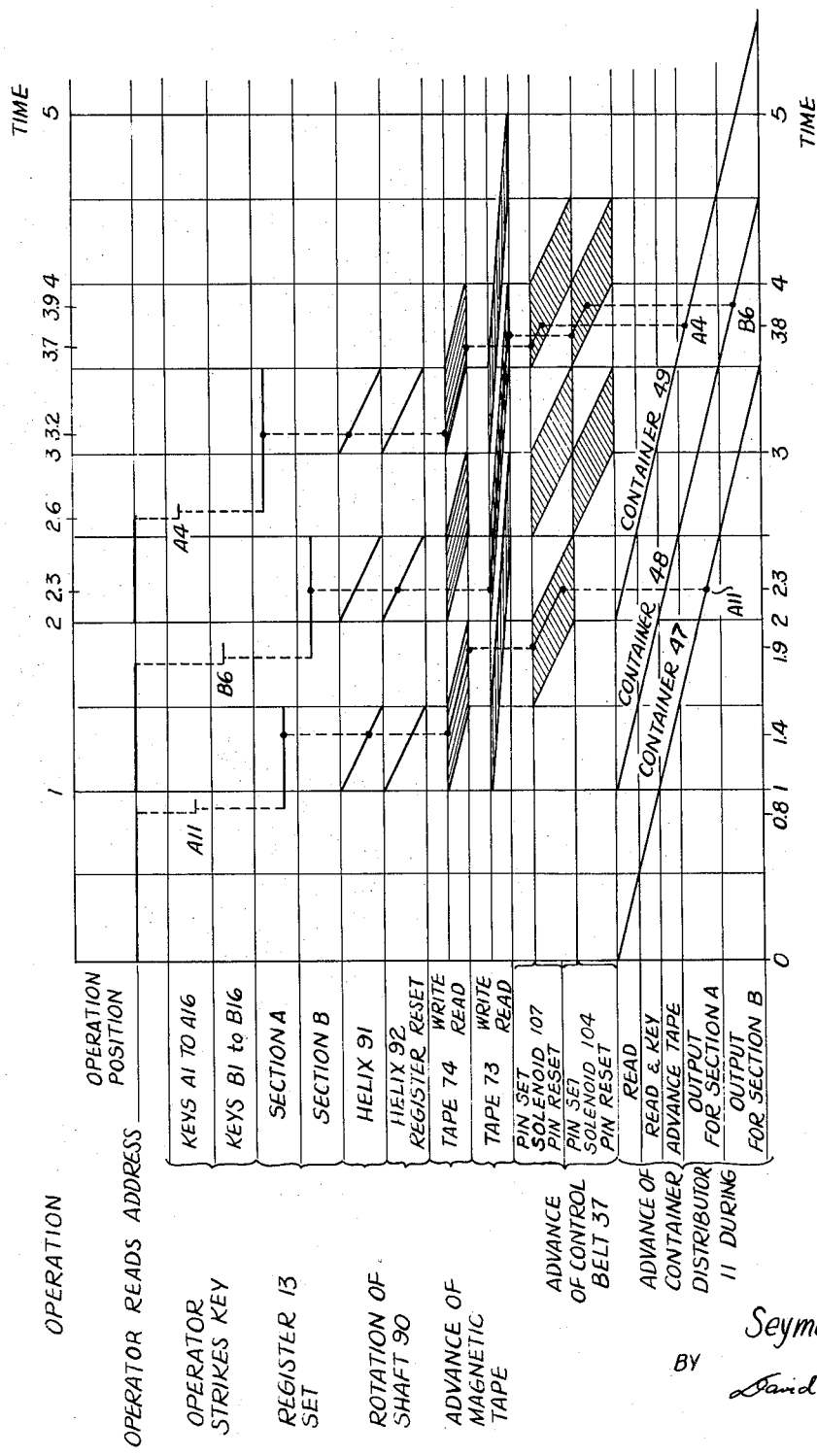
FIG. 11 is an operation-position-time schedule of the embodiment in FIG. 1.

Drive chains 24, 25, magnetic tapes 73, 74 and control belt 37 are driven at speeds that are selected to obtain the operation-position-time schedule in FIG. 11. As an example, drive chains 24, 25 and belt 37 may be driven at speeds equal to $d/t$ and $2d/t$, respectively, where $d$ is the distance between solenoids 104, 107; and magnetic tapes 73, 74 may be driven at a speed equal to $d_1/t$, where $d_1 =$ (distance between heads 98, 103) − (distance between heads 101, 106) and $t$ is time in suitable units.

Figure 7:
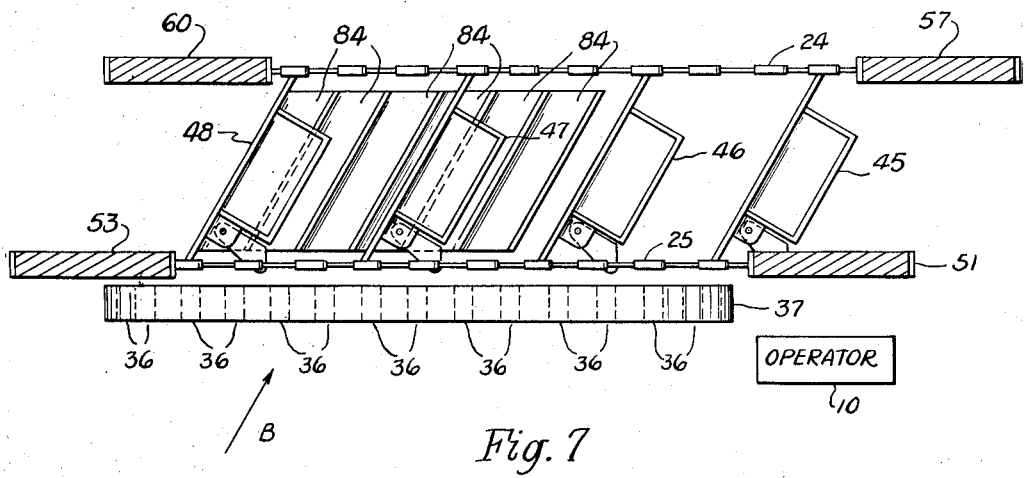
FIG. 7 is a top view of the structure in FIG. 5 taken along line A—A′.

Referring to FIGS. 5 and 7, the latter is a section of FIG. 5 taken along the line A—A'. Drive chain 25 and sprockets 50, 51 and 53 are omitted in FIG. 5. Article collector 17 comprises compartments 84 which are positioned below containers 23 and 41 to 49 as they traverse the lower portion of their path. As the containers traverse the upper portion of their path, letter feed tray 85 and unstacker 86 feed a letter into each container. (To simplify the drawing, only a limited number of compartments are shown.) Each compartment 84 is a discharge point and is assigned to a respective one of the addresses on overlay 21 so that the letters dropped into the compartments are arranged in the same sequence as the addresses on the carrier's route.

Referring to FIGS. 2 and 8, shaft 90, having a diameter D, is rotated continually by a conventional arrangement, not shown. Each horizontal row of keys in keyboard 12 is associated with a respective helix of conductive material located on the shaft which is made of non-conductive material. Thus, keys A1 to A16 are associated with helix 91, keys B1 to B16 with helix 92, and keys C1 to C16 with a helix which, for simplicity of illustration, is not shown. Each helix is positioned around one half and along the longitudinal axis of shaft 90. Lead 89, located inside shaft 90, connects helix 91 to slip-ring 93. Helix 92 is connected directly to slip-ring 94. (See FIG. 9.) The development in FIG. 9 is not drawn to scale.

Brush 97, positioned in contact with slip-ring 94, is tied to writing head 98 through amplifier 99. Likewise brush 100, positioned in contact with slip-ring 93, is tied to writing head 101 through amplifier 102. The output of reading head 103 is fed to solenoid 104 through amplifier 105. Similarly, the output of reading head 106 is fed to solenoid 107 through amplifier 108. Erasing heads 95, 96 are positioned between heads 98, 103 and heads 101, 106, respectively. It is apparent that for each helix of conductive material, a slip-ring, a writing, reading and erasing head, two amplifiers and a solenoid are used.

When energized by a pulse, the plunger of solenoid 104 or 107 will set a respective one of pins 36 as illustrated by pins 36a in FIG. 3 and 36b in FIG. 8. Stationary cams 109 and 109a are positioned to reset any previously set pin 36 as control belt 37 moves past the cams.

Register 13 in FIG. 1 includes a plurality of cams 110 rotatably mounted in a groove 111 of shaft 112. (See FIG. 8.) Each cam is associated with a particular one of the keys in the first horizontal row of keyboard 12, namely, keys A1 to A16.

To simplify the drawing, only one cam 110 and one key A1 are shown in FIG. 8. The key is rotatably mounted on shaft 113. Key A1 and cam 110 are maintained in their normal positions, shown in this figure, by springs 114, 115, respectively, which are attached to supporting member 116. Brush 117 is located on spring 118 which is attached to supporting member 119. Follower 120, keyed on shaft 112, is positioned to engage cam 121 as shaft 90 rotates.

When key A1 is depressed, cam 110 is rotated by the key until surface 122 of the cam engages surface 123 of shaft 112. The cam is held in this, its set position, by spring 115, and sensing brush 117 is placed in contact with the surface of shaft 90. As the shaft rotates, the brush senses helix of conductive material 91 so that a pulse is applied from D.C. source 124 through brush 117, helix 91, lead 89 and slip-ring 94 to writing head 98 and is then recorded on tape 73. The pulse has a fixed duration determined by the speed of shaft 90 and the width of the helix. Cam 121 then engages follower 120 to reset cam 112 to its normal position. Similarly, when keys A2 to A16 are depressed, a pulse will be recorded on the tape. Because in each instance a different portion of helix 91 is sensed, the time relationship between the pulses generated by keys A1 to A16 may be represented by the time-position code illustrated in FIG. 10.

The operation-position-time schedule shown in FIG. 11 will be used immediately below in presenting examples of operation of the present embodiment. In this figure, the dotted lines represent an interlock between the operator and the collocating machine or between two components of the machine. The shaded portions represent time-distance areas in which a particular operation may occur. Section A of register 13 in this figure refers to the cams 110 and associated elements controlled by keys A1 to A16; section B refers to the cams and associated elements controlled by keys B1 to B16.

Considering an example of operation, assume that as container 47 passes the operator at time 0.8 in FIG. 11, he reads the address for destination A11. Shortly thereafter, he strikes key A11, rotating its associated cam 110 in FIG. 8 to its set position where it is maintained by spring 115. The cam urges brush 117 against the surface of shaft 90, completing the operation that sets register 13. As the shaft rotates, helix 91 is sensed at time 1.4 to generate a time-position pulse which is applied to amplifier 102 and then recorded on magnetic tape 74. Cam 110 is reset when cam 121 engages follower 120.

All previously set pins 36 are reset in passing cams 109 and 109a. At time 1.9, as tape 74 advances past reading head 106, the stored pulse is read, applied to amplifier 108, and then used to operate the plunger of solenoid 107 which sets pin 36b.

Since control belt 37 is driven at a greater speed than chains 24, 25 at time 2.3, pin 36b overtakes container 47. The pin rotates cam 33 clockwise to open gate 31 of the container, dropping the letter into the compartment 84 associated with key A11 and the address for that key.

As another example of operation, assume that a container 48 passes the operator, the address for destination B6 is read at time 1.9 and key B6 is struck shortly thereafter. A cam 110 is register 13 is set. As shaft 90 rotates, helix 92 is sensed at time 2.3 when a pulse is generated, applied to amplifier 99 and then recorded in tape 73. At a time 3.7, as the tape advances past reading head 103, the pulse is read, applied to amplifier 105 and then used to operate the plunger of solenoid 104, setting one of the pins 36. At time 3.9, this pin overtakes container 48, rotates its cam 33 clockwise to open its bottom gate 31 to drop the letter into the compartment 84 associated with the address corresponding to key B6.

As a final example, assume the letter in container 49 has an address that is read at time 2.6 and key A4 is struck immediately thereafter. At time 3.2, helix 91 is sensed, a pulse is generated and recorded in magnetic tape 74. At time 3.7, this pulse is read out and used to set one of the pins 36 which overtakes container 49 at time 3.8 to open the gate 31 of the container. The letter drops into the compartment corresponding to the address and to key A4.

From FIG. 11, it is seen that a key is struck and a cam 110 in register 13 is set during the time interval when the blank portion of shaft 90 is presented to sensing brush 117.

The foregoing examples illustrate the manner in which a pulse of a time-position code is generated, stored for a selected time interval, and then used to set a pin 36 which overtakes a container in distributor 11 to discharge the latter's contents at the point associated with the pulse.

What is claimed is:

1. In a collocator wherein each pulse in a time-position code is associated with a respective one of a plurality of discharge points, a rotatable member of nonconductive material, means for rotating said member, a plurality of strips of conductive material, each positioned on the surface of said member, a plurality of brushes, each connected to a source of potential, said brushes being positioned so that when each brush is urged against the surface of said member it will contact a respective one of said strips as said member rotates thereby generating a respective pulse in said time-position code, control means for selectively urging said brushes into contact with the surface of said member, a plurality of slip-rings of conductive material positioned on the surface of said member, each slip-ring connected to a respective one of the strips of conductive material, a distributor including a plurality of containers, and means connected to said slip-rings and responsive to any one of said pulses for selectively controlling said containers in the vicinity of the discharge point associated with the pulse.

2. A collocator set forth in claim 1 wherein said control means comprises a keyboard including a plurality of keys, means responsive to the operation of each key for selectively urging a respective one of said brushes into contact with the surface of said rotatable member, and an overlay positioned on said keyboard, said overlay having printed thereon near each key the discharge point associated with the pulse generated in response to the operation of the key.

3. In a collocator wherein each pulse in a time-position code is associated with a respective one of a plurality of discharge points, a rotatable member of nonconductive material, means for rotating said member, a plurality of strips of conductive material, each positioned on the surface of said member, a plurality of brushes, each connected to a source of potential, said brushes being positioned so that when each brush is urged against the surface of said member it will contact a respective one of said strips as said member rotates thereby generating a respective pulse in said time-position code, control means for selectively urging said brushes into contact with the surface of said member, a plurality of slip-rings of conductive material positioned on the surface of said member, each slip-ring connected to the respective one of the strips of conductive material, a distributor comprising a plurality of containers, each including a gate having an open position and a closed position and a latch for holding said gate in the closed position, a control mechanism including a plurality of pins each having a set and a reset position, said mechanism being positioned so that a pin in its set position may engage a latch of one of said containers, means responsive to any one of said pulses for selectively moving one of said pins to its set position, and means for driving said distributor and control mechanism at respective speeds selected so that a pin in its set position will engage the latch of one of said containers when the latter container is in the vicinity of the discharge point associated with the pulse that effected the setting of the pin.

4. The collocator set forth in claim 3 wherein said control means comprises a keyboard including a plurality of keys, means responsive to the operation of eack key for selectively urging a respective one of said brushes into contact with the surface of said rotatable member, and an overlay positioned on said keyboard, said overlay having printed thereon near each key the discharge point associated with the pulse generated in response to the operation of the key.

5. In a collocator wherein each pulse in a time-position code is associated with a respective one of a plurality of discharge points, a rotatable member of nonconductive material, means for rotating said member, a plurality of strips of conductive material, each positioned on the surface of said member, a plurality of brushes, each connected to a source of potential, said brushes being positioned so that when each brush is urged against the surface of said member it will contact a respective one of said strips as said member rotates thereby generating a pulse in said time-position code, control means for selectively urging said brushes into contact with the surface of said member, a plurality of slip-rings of conductive material positioned on the surface of said member, each slip-ring connected to a respective one of the strips of conductive material, a distributor comprising a plurality of containers, each including a gate having an open and a closed position and a latch for holding said gate in the closed position, time-delay means for delaying each pulse for a selected time interval, said delay means including a magnetic tape, a plurality of recording heads and reading heads, means connecting each slip-ring to a respective one of the recording heads in such a manner that each generated pulse is recorded on said magnetic tape, a control mechanism including a plurality of pins each having a set and a reset position, said mechanism being positioned so that a pin in its set position may engage a latch of one of said containers, means responsive to a pulse in the output of each reading head for selectively moving one of said pins to its set position, means for driving the magnetic tape, and means for driving said distributor and control mechanism at respective speeds selected so that a pin in its set position will engage the latch of one of said containers when the latter container is in the vicinity of the discharge point associated with the pulse that effected the setting of the pin.

6. The collocator set forth in claim 5 wherein said control means comprises a keyboard including a plurality of keys, means responsive to the operation of each key for selectively urging a respective one of said brushes into contact with the surface of said rotatable member, and an overlay positioned on said keyboard, said overlay having printed thereon near each key the discharge point associated with the pulse generated in response to the operation of the key.

7. In a collocator wherein each pulse in a time-position code is associated with a respective one of a plurality of discharge points, a rotatable member of nonconductive material, means for rotating said member, a strip of conductive material positioned on the surface of said member, a brush connected to a source of potential, said brush being positioned so that when urged against the surface of said member it will contact said strip of conductive material as said member rotates, thereby generating a respective pulse in said time-position code, control means for selectively urging said brush into contact with the surface of said member, a slip-ring of conductive material positioned on the surface of said member and connected to said strip of conductive material, a distributor including a plurality of containers, and means connected to said slip-ring and responsive to any one of said pulses for selectively controlling said containers in the vicinity of the discharge point associated with the pulse.

8. A collocator comprising: a single channel, means for selectively generating the pulses of a time-position code and for transmitting the pulses in sequence over said channel, a plurality of discharge points, each associated with a respective one of said pulses, a distributor comprising a plurality of containers, a control mechanism including a plurality of pins, each having a set and a reset position, said mechanism being positioned so that each of said pins in its set position may control one of said containers an actuator connected to the output of said channel and responsive to any one of said pulses for selectively moving one of said pins to its set position, and means for driving said distributor and control mechanism at respective speeds selected so that a pin in its set position will selectively control one of said containers when the latter container is in the vicinity of the discharge point associated with the pulse that effected the setting of the pin.

9. The collocator set forth in claim 8 wherein the signal generating means comprises: a keyboard including a plurality of keys, means responsive to each of said keys for generating a respective pulse in a time-position code, and an overlay positioned on said keyboard, said overlay having printed thereon near each key the discharge point associated with the pulse generated in response to the operation of the key.

10. A collocator comprising: a single channel, means for selectively generating the pulses of a time-position code and for transmitting the pulses in sequence over said channel, a plurality of discharge points, each associated with a respective one of said pulses, a distributor comprising a plurality of containers, each including a gate having an open position and a closed position and a latch for holding said gate in the closed position, a control mechanism including a plurality of pins, each having a set and a reset position, said mechanism being positioned so that each of said pins in its set position may engage a latch of one of said containers, an actuator connected to the output of said channel and responsive to any one of said pulses for selectively moving one of said pins to its set position, and means for driving said distributor and control mechanism at respective speeds selected so that a pin in its set position will engage the latch of one of said containers when the latter container is in the vicinity of the discharge point associated with the pulse that effected the setting of the pin.

11. A collocator comprising: a single channel, means for selectively generating the pulses of a time-position code and for transmitting the pulses in sequence over said channel, a plurality of discharge points, each associated with a respective one of said pulses, time-delay means positioned in each channel for delaying each pulse for a selected time interval, said delay means including a magnetic tape, a recording head and a reading head, means for applying the output of the signal generating means to said recording head, whereby each generated pulse is recorded on said magnetic tape, a distributor comprising a plurality of containers, a control mechanism including a plurality of pins, each having a set and reset position, said mechanism being positioned so that each of said pins in its set position may selectively control one of said containers, an actuator connected to the output of said reading head and responsive to any one of said pulses for selectively moving one of said pins to its set position, and means for driving said distributor and control mechanism at respective speeds selected so that a pin in its set position will selectively control one of said containers when the latter container is in the vicinity of the discharge point associated with the pulse that effected the setting of the pin.

References Cited in the file of this patent

UNITED STATES PATENTS

| | | |
|---|---|---|
| 1,868,894 | Glahn | July 26, 1932 |
| 2,194,381 | Cadman | Mar. 19, 1940 |
| 2,666,484 | Schubert | July 19, 1954 |
| 2,863,574 | Henig | Dec. 9, 1958 |
| 2,941,666 | Sims | June 21, 1960 |
| 2,988,237 | Devol | June 13, 1961 |